(12) United States Patent
Son et al.

(10) Patent No.: US 7,159,235 B2
(45) Date of Patent: Jan. 2, 2007

(54) METHOD AND APPARATUS FOR CONTENT DISTRIBUTION VIA NON-HOMOGENEOUS ACCESS NETWORKS

(75) Inventors: Yong Ho Son, Palo Alto, CA (US); Christopher W. B. Goode, Menlo Park, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 950 days.

(21) Appl. No.: 09/772,287

(22) Filed: Jan. 29, 2001

(65) Prior Publication Data

US 2002/0026645 A1 Feb. 28, 2002

Related U.S. Application Data

(60) Provisional application No. 60/178,857, filed on Jan. 28, 2000, provisional application No. 60/178,810, filed on Jan. 28, 2000, provisional application No. 60/178,809, filed on Jan. 28, 2000, provisional application No. 60/178,795, filed on Jan. 28, 2000.

(51) Int. Cl.
*H04N 7/173* (2006.01)
*G06F 15/16* (2006.01)

(52) U.S. Cl. .................. 725/91; 725/119; 709/203; 709/218

(58) Field of Classification Search .............. 725/87, 725/91, 92, 119, 127, 149, 129, 74, 78, 82; 709/203, 218

See application file for complete search history.

(56) References Cited

U.S. PATENT DOCUMENTS

| | | | |
|---|---|---|---|
| 5,835,125 A * | 11/1998 | Bhagavath | 725/129 |
| 5,883,891 A | 3/1999 | Williams et al. | 370/356 |
| 5,898,456 A * | 4/1999 | Wahl | 725/91 |
| 5,928,331 A | 7/1999 | Bushmitch | 709/231 |
| 6,157,675 A | 12/2000 | Mitsuhashi et al. | 375/240.01 |
| 6,185,737 B1 * | 2/2001 | Northcutt et al. | 725/110 |
| 6,247,048 B1 * | 6/2001 | Greer et al. | 709/219 |
| 6,557,031 B1 * | 4/2003 | Mimura et al. | 709/218 |
| 6,611,522 B1 * | 8/2003 | Zheng et al. | 370/395.21 |

FOREIGN PATENT DOCUMENTS

| | | |
|---|---|---|
| EP | 0 811 939 A | 12/1997 |
| EP | 0 872 990 | 10/1998 |
| EP | 0 901 261 A | 3/1999 |

OTHER PUBLICATIONS

U.S. Appl. No. 08/984,710, filed Dec. 3, 1997, entitled: System for Interactively Distributing Information Services.

(Continued)

*Primary Examiner*—Chris Kelley
*Assistant Examiner*—Joseph G. Ustaris
(74) *Attorney, Agent, or Firm*—Patterson & Sheridan, LLP (57) ABSTRACT

A method and apparatus for streaming content to an access network in an interactive information distribution system. The method encapsulates the content in accordance to an Internet Protocol (IP). The content is then transcoded into a format supported by the access network, and streamed over a distribution network to a remote server or to a subscriber terminal that is coupled to the access network. The apparatus is embodied as stream caching server for streaming the content encapsulated within the IP packet to access networks via a stream distribution network in response to a request for content. A packet processor is coupled to the stream server for processing the encapsulated content within the IP packets into a format native to the access network.

31 Claims, 6 Drawing Sheets

OTHER PUBLICATIONS

U.S. Appl. No. 09/458,337, filed Dec. 10, 1999, entitled: Method and Apparatus for Storing and Acccessing Multiple Constant Bit Rate Data.

U.S. Appl. No. 09/772,288, filed Jan. 29, 2001, entitled: Method and Apparatus for Preprocessing and Postprocessing Content in an Interactive Information Distribution System.

Supplementary European Search Report in corresponding EP 01 90 6700, May 8, 2006, Sedna Patent Services, LLC.

Nussbaumer J-P et al: "Networking Requirements for Interactive Video on Demand" IEEE Journal on Selected Areas in Communications, IEEE Service Center, Piscataway, NJ, US, vol. 13, No. 5, Jun. 1, 1995, pp. 779-787, XP000499086 ISSN: 0733-8716.

Milind M. Budhikot, Guru M. Parulkar et al: "Design of Large-Scale Multimedia-on-Demand Storage Servers and Storage Hierarchies" The Handbook of Multimedia Information Management, 1997, pp. 279-333, XP008063612 ISBN: 0-13-207325-0.

\* cited by examiner

METHOD AND APPARATUS FOR CONTENT DISTRIBUTION VIA NON-HOMOGENEOUS ACCESS NETWORKS

CROSS-REFERENCE TO RELATED APPLICATION

This invention claims benefits of U.S. Provisional Patent Application Ser. Nos. 60/178,810, 60/178,857, 60/178,795, and 60/178,809 all filed Jan. 28, 2000, and such applications are all hereby incorporated herein by reference in their entirety.

This invention is related to simultaneously filed U.S. patent application Ser. No. 09/772,288 filed on the same date as this application, and such application is herein incorporated by reference in its entirety.

BACKGROUND OF THE INVENTION

1. Field of the Invention

The invention relates to electronic data storage and transmission of content or information. More particularly, the invention relates to a method and apparatus for streaming content in an interactive information distribution system.

2. Description of the Background Art

Information systems such as video on demand (VOD) systems are capable of streaming a program content selection to a great number of users or subscribers. To provide program content requested by a subscriber, a video server retrieves the requested program content from a storage medium and transmits the program content over a stream distribution network to a local access network (e.g., a cable television network). The local access network supports a group or "neighborhood" of subscriber terminals, and downloads the program content to the requesting subscriber. The subscriber may then view the requested program content at their subscriber terminal, display coupled to a set-top box, or any other subscriber equipment capable of extracting audio, video, and data signals from the program content.

Various types of access networks have evolved and become standardized, such as the Internet, cable networks, LAN/WAN networks, digital subscriber lines DSL, satellite, and the like. Furthermore, each type of network requires specific transport data structures and protocols, as well as having various limitations with respect to transmission latency, bandwidth, and the like. To service a wide subscriber base, the VOD systems currently implement different solutions for each type of access network. For example, VOD systems that provide web-based video content along public and private wide area networks require distribution of content at a particular quality of service (QoS), e.g., bit rate, medium latency, low bandwidth, and lower grade quality video (e.g., higher jitter). Alternately, VOD systems that provide cable-based video along cable networks require a quality of service having low latency, high bandwidth, and high quality video.

In order to accommodate multiple access networks, separate video servers are provided at a head-end for each type of access network. However, such a solution increases the cost of providing program content at the head end, since more hardware is required. To reduce such costs and other deficiencies, there is a need in the art to provide a scalable VOD solution that is readily adapted to different types of access networks.

SUMMARY OF THE INVENTION

The invention provides a method and apparatus that is capable of streaming content to different types of access networks in an interactive information distribution system. The method initially receives content encapsulated in accordance to an Internet Protocol (IP). In one embodiment, the content is configured as a plurality of packets, e.g., MPEG-2 or MPEG-4, contained in a payload of a Realtime Transport Protocol (RTP) packet within an IP packet. The content is then transcoded into a format supported by a particular subscriber terminal, and streamed over a distribution network to a remote server or to a subscriber terminal that is coupled to the access network. The apparatus is embodied as a stream caching server and, illustratively, a packet processor within the interactive distribution system.

By streaming program content in a manner that is common for servicing various types of access networks and subscriber terminals, the present invention provides scalable streaming of content to cable plants, digital subscriber line (xDSL) plants, terrestrial distribution networks, satellite distribution networks, private networks, the Internet, and the like. The storage of the content in IP format minimizes the amount of data conversion otherwise required to stream content between different types of networks. Additionally, the payload of the RTP packet is sized as a read block to minimize latencies in retrieving and streaming content. That is, the storage media read block size conforms to the optimal buffer size units of the current equalization of the stream servers. Furthermore, since the content is stored at the stream cache servers as IP packets, a communications (i.e., protocol) stack is not required at either the input or output of the distribution network.

BRIEF DESCRIPTION OF THE DRAWINGS

The teachings of the present invention can be readily understood by considering the following detailed description in conjunction with the accompanying drawings, in which.

To facilitate better understanding of the invention, identical reference numerals have been used, where possible, to designate identical elements that are common to the figures.

DETAILED DESCRIPTION

The invention provides a method of distributing (i.e., streaming) packets of content (e.g., video-on-demand, pay-per-view, MP3, digital broadcast, or any other content that may be streamed) from a common distribution source such as a video stream server, to various types of access network domains (e.g., LAN/WAN, cable, digital subscriber line, satellite, terrestrial, and the like). In particular, the invention allows for an extension of Internet protocols into traditionally non-Internet networks, as well as use of existing commercial equipment for providing interactive streaming services. As such, the existing Internet backbone may be utilized to provide streaming services to these various non-Internet networks.

Figure 1:
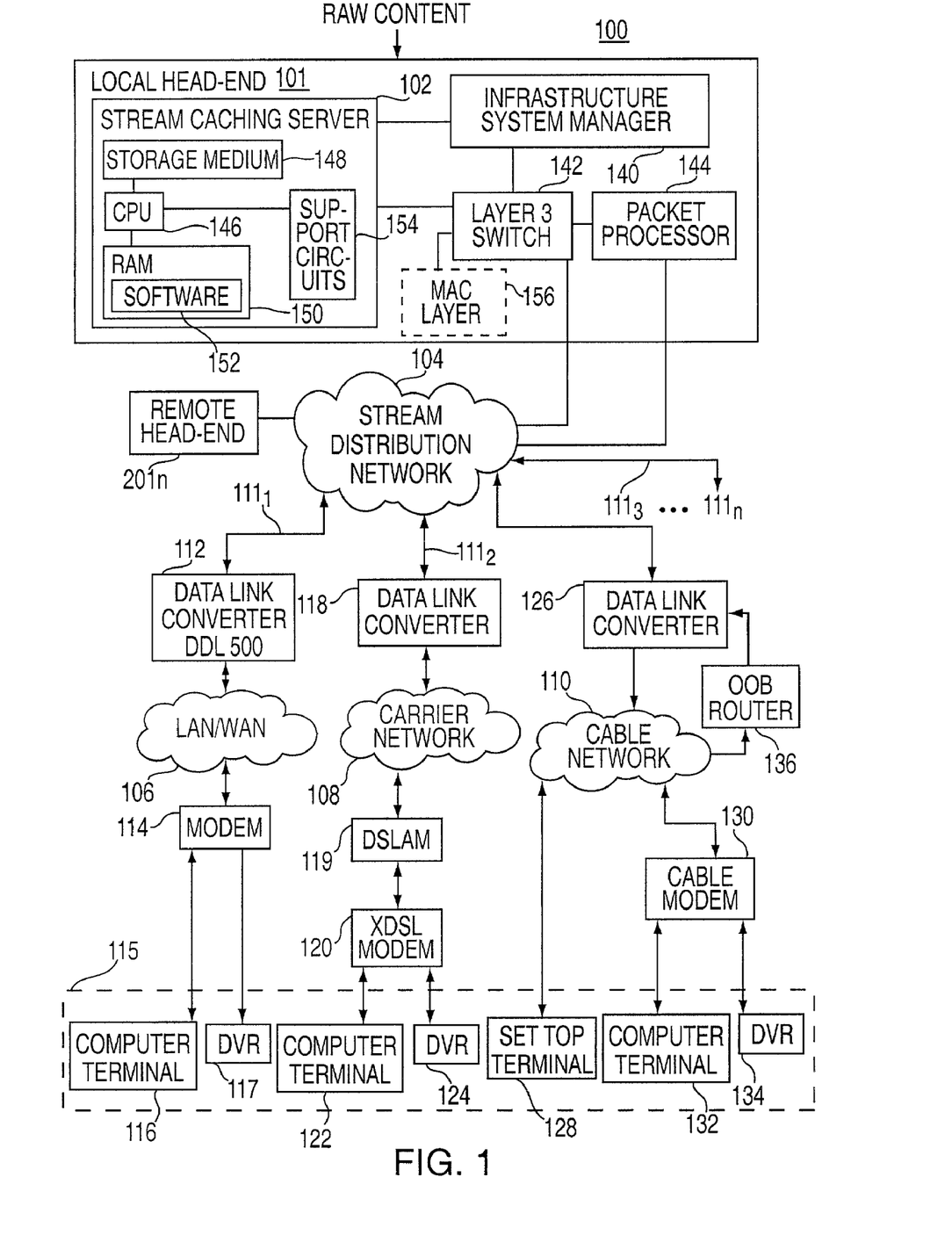
FIG. 1 depicts a high-level block diagram of an interactive information distribution system embodied in the present invention.

FIG. 1 depicts a high-level block diagram of an interactive information distribution system 100. One exemplary distribution system 100 is for video-on-demand (VOD) is described in U.S. Pat. No. 6,253,375, and hereby incorporated herein by reference in its entirety. In such a VOD system 100, a user may request and receive a particular content selection, e.g., video, movie, or programming content from a service provider without any time restrictions (e.g., time slots) such as those normally associated with cable and television programming.

The system 100 comprises a local head-end 101, one or more remote head-ends $201_n$, a stream distribution network 104, a plurality of access networks $111_1$ through $111_n$ (collectively access networks 111) and a plurality of subscriber equipment 115. The system 100 streams content from the stream caching server 102, where the content is formatted as Internet Protocol (IP) packets. Specifically, the content is configured as a plurality of packets (e.g., MPEG packets) contained in a payload of a Realtime Transport Protocol (RTP) packet within an IP packet. The use of this IP formatted content enables a single stream caching server 102 located at the head-end to stream content over the stream distribution network 104 to either homogeneous or non-homogeneous types of access networks 111 in a format native to such access network 111. As such, the system 100 is capable of streaming the same content to, for example, a person utilizing cable service, a computer on the Internet, a DSL, satellite, and the like.

The stream distribution network 104 serves as the "backbone" structure of the network and may include multiple physical layers such as synchronous optical networks (SONET) and/or an asynchronous transfer mode (ATM) type of network, as well as virtual private networks (VPN) over existing Internet backbones. As such, a plurality of local head ends 101 may be remotely located from each other, where one or more providers, such as a long distance phone company, provides the stream distribution network 104 connectivity therebetween.

Each local head-end 101 has a switch 142, which serves as an input to the stream distribution network 104 when "downstreaming" content (i.e., providing content toward subscribers), and an output to the stream distribution network 104 when "upstreaming" requests or content (i.e., receiving content or requests from subscribers). Furthermore, each access network 111 is coupled to the stream distribution network 104 via an interface such as data link converter 112. The data link converter 112 serves as an output port to the stream distribution network 104 when downstreaming content, and as an input port to the stream distribution network 104 when upstreaming requests or content.

The local head end 101 comprises a stream caching server 102, an infrastructure system manager 140, a switch 142, and a packet processor 144 such as an MPEG packet processor. The stream caching server 102 comprises a central processing unit (CPU) 146, a storage medium 148, memory (e.g., RAM) 150, and support circuits 154. The RAM 150 stores a software program 152 that is executed by the CPU 146 to implement the present invention. The CPU 146 executes the software program 152 to thereby coordinate the streaming of content to the distribution network 104. The storage medium 148 stores the content that is streamed by the stream caching server 102. This content is stored as files according to the IP protocol, that is, in IP packet form. One configuration of the storage medium 148 is a redundant set of disk arrays, e.g., Redundant Array of Inexpensive Disks (RAID) where the IP packets of each file are striped across the set of disks. The support circuits 152 provide an interface for receiving system commands from the manager 140, streaming content to the distribution network 104, and the like.

The infrastructure system manager 140 having a controller 160, and memory (not shown) coordinates a user request from the subscriber equipment 115 by passing the user request to the stream caching server 102, and then establishing a session between the subscriber equipment and the stream caching server 102.

The switch 142 is capable of routing, illustratively, MPEG and/or IP packets. The switch 142 routes the user request from the stream distribution network 104 to the system manager 140. Additionally, the switch 142 routes the content from the stream caching server 102 to the packet processor 144. The packet processor 144 provides preprocessing and post processing operations content. The preprocessing operations performed on the content, modify the content to a format and size that corresponds or accommodates the characteristics of the stream server 102. Raw content such as packet elementary streams of audio, video, data, and the like are provided by a service provider, video library and the like to the local and remote head-ends 101 and $102_n$. During the preprocessing operation, the packet processor 144 transcodes (i.e., decoding and then encoding) the content from one format to another format as necessary, prior to storing the content on the storage medium 148. Preferably the content is compressed as MPEG packets (e.g., MPEG-1, MPEG-2, or MPEG-4 packets) encapsulated in a portion of the payload of an IP packet if not already received from the content provider in such format. In this manner, concurrent streams may be provided to multiple access networks 111 from a single copy stored on the storage medium 148

Figure 3A:
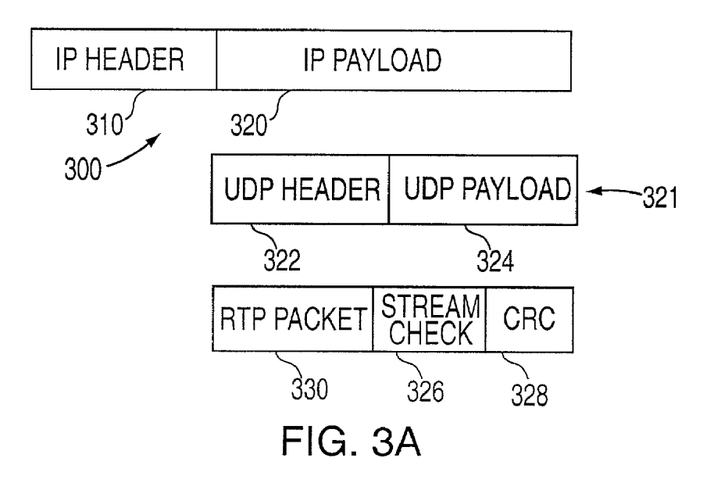
FIG. 3A depicts one embodiment of an Internet Protocol (IP) packet used in the present invention.

FIG. 3A depicts one embodiment of an Internet Protocol (IP) packet 300 used in the present invention. The IP packet 300 comprises an IP header 310 and an IP payload 320. The IP payload 320 comprises a UDP (User Datagram Protocol) packet 321 having a UDP header 322 and a UDP payload 324. The UDP payload 324 further comprises a Realtime Transport Packet (RTP) 330, a stream integrity check 326, and a cyclic redundancy check (CRC) 328. In one embodiment of the IP packet 300, the IP header 310 is 20 bytes, the UDP header 322 is 8 bytes, the stream integrity check field 426 is 4 bytes and the CRC field 428 is 4 bytes.

Figure 3B:
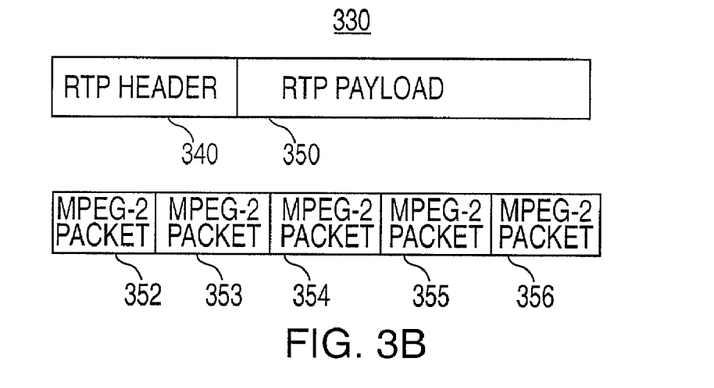
FIG. 3B depicts one embodiment of a Realtime Transport Packet (RTP) contained in a payload section of the IP packet of FIG. 3A.

FIG. 3D depicts one embodiment of a Realtime Transport Packet (RTP) 330 encapsulated in a payload section 320 of the IP packet 300 of FIG. 3A. The RTP packet 330 comprises a RTP header 340 and a RTP payload 350. The RTP payload 350 contains the actual packetized content (e.g., MPEG-2 transport packets 352 through 356) containing the subject matter (e.g. movie, audio, data, and the like) that a subscriber or user is interested in retrieving. The format of the packetized content 252 through 256 may be in the packetized format as received from the content provider, or transcoded during the preprocessing operation by the packet processor 144 into a format that accommodates the stream server 102. In particular, the number of content packets positioned in the RTP payload is dependent on design limitations of the server components. Specifically, the IP packets are striped across an array of disks in the storage medium 148 such that each respective data block or "extent" stored on a disk has a size corresponding to a predefined amount of IP packets. The size of the read block is a multiple integer of the RTP packet size. Furthermore, the RTP packet is sized to optimize the use of a buffer in the packet processor 144, which has a specific memory capacity (e.g., 1 Kbyte). As such, the RTP packet 330 is sized such that a multiple integer of RTP payloads 350 may be read by a read block to thereby minimize the latencies in retrieving and streaming content from the stream caching server 102 to the distribution network 104. For a detailed understanding of defining extent size for storing data streams having different bit rates, the reader is directed to U.S. Pat. No. 6,282,207 which is hereby incorporated by reference herein In its entirety.

For example, a read block for the packet processor 144 is sized to read MPEG-2 packets that are encapsulated in the payload of each RTP packet. Furthermore, the number of MPEG-2 packets in the RTP payload 350 corresponds to the buffer space in the Fiber Channel controller (not shown) of the packet processor 144. Specifically, the buffer space in the Fiber channel controller has buffer granularity for five MPEG-2 packets. As such, five MPEG-2 packets 352 through 356 are illustratively shown in the RTP payload 350. Accordingly, the content is configured as a plurality of packets contained in a payload 350 of a RTP packet 330, wherein the RTP packet 330 resides within the payload 320 of the IP packet 300. The RTP format (RFC 1889) minimizes the latency in streaming content from the server by supporting the streaming of content in real time.

After a user request is received from a user or subscriber of services located at a particular access network, the packet processor 144 is capable of post processing the stored content into a format that conforms to the particular access network from which the request for content originated. Post processing by the MPEG processor 144 includes sizing (e.g., "grooming") and optionally transcoding the underlying content located in the IP payload into a format native to the access network 111 of the requester. That is, the underlying packet structure is adapted to the requester's access network, while the encapsulating IP packet structure is used to deliver the modified or unmodified underlying packet structure to the access network via the distribution network (IP "backbone") 104.

Transcoding of the underlying content (e.g., MPEG transport packets 252 to 256) in the RTP payload 350 of the packets is performed to accommodate transfer over the particular access network 111 from where the request for content originated. The packet processor 144 transcodes the content without disturbing the overall IP format of the packet (i.e., header information), since the IP format is required to transfer the entire packet over the stream distribution network 104. The packet processor 144 illustratively extracts the 5 MPEG packets 352 through 356 from the IP, UDP, and RTP header information 310, 322, and 340 respectively, and transcodes the MPEG packets 352 through 356 into a format supported by the access network 111 where the request for such content originated. The transcoding is performed by decoding the underlying content in its original packet format (e.g., MPEG-2 packets), and then encoding the decoded content into a new packet format. As such, the transcoding may change the rate of the content. For example, the transcoding may include the conversion of MPEG-2 formatted content into MPEG-1, AVI, MPEG-4, Moving JPEG, windows media, real video format content, and the like. Furthermore, the number of packets in the RTP payload 350 may be illustratively changed (e.g., 5 MPEG-2 packets into 4 MPEG-4 packets.

The transcoding is performed in accordance to an extended Real Time Streaming Protocol (RTSP-RFC 2326) such that stream manipulations conform to Internet standards and are applicable to any access network 111 that supports an Internet protocol.

The packet processor 144 combines the transcoded packets with the IP, UDP, and RTP header information to recreate the IP packet. Furthermore, the content in the IP packet can be configured to maintain a specific level or range of Quality of Service (QoS). The quality of service to the subscribers includes providing the necessary rate of streaming content (e.g., constant bit rate (CBR) or variable bit rate (VBR)) and tolerable jitter over a specific bandwidth to the subscribers. Accordingly, other functions performed by the MPEG processor 144 include jitter correction, creation of packet elementary streams (PES), stream splicing, statistical multiplexing, and the like.

In one embodiment, the transcoding is performed by the MPEG processor 144 prior to storing the content in IP packet form on the storage medium 148. In particular, multiple copies of the content are stored in the various packet formats (e.g., MPEG-1, MPEG-4, AVI, MJPEG, and the like) on the storage medium 148 for subsequent distribution to a respective access network 111 as required. Alternately, in a second embodiment, the content is stored illustratively as MPEG-2 packets encapsulated in an IP packet, and is subsequently transcoded "on the fly", that is after the IP packets have been retrieved from the storage medium 148. In the former embodiment, greater storage capacity is required, while in the latter embodiment, greater processing capacity is required.

Furthermore, the transcoded IP packets are also sized at the head-end 101 prior to distribution over the stream distribution network 104 for a plurality of 64 QAM or 256 QAM channels at the data link converters. The distribution network 104 carries groupings of streams that have been adapted to the 64 QAM or 256 QAM channels to the data link converters (e.g., 112). Each data link converter comprises a plurality of Quadrature Amplitude Modulation (e.g., 2–32) modulators (not shown). In particular, the packets are sized to carry additional information pertaining to the underlying content (e.g., program system information (PSI) for MPEG type packets) at the head-end 101 as opposed to being inserted downstream at the access network. Thus, processing for each QAM channel is moved to the input of the distribution network 104, as opposed to the output (i.e., data link converter) of the distribution network 104.

In the exemplary system 100 depicted in FIG. 1, three types of access networks 111 are illustratively shown. Each access network 111 is coupled to the distribution network 104 by the data link converter (e.g., 12, 118, and 126). The IP header 310 contains source and destination addresses for delivering the IP packet. The source address is the address of the stream cache server 102 and the destination address is the address of the destination access network 111. Once the IP packet is received by the data link converter, the underlying content (e.g., MPEG packets 352–356) are transferred to the subscriber equipment 115 of the requester. How the underlying content is transferred to the particular subscriber equipment 115 is dependent on the type of access network as discussed below.

One type is a LAN/WAN network 106, which typically is a private network or one provided by an Internet Service Provider (ISP). The physical layer of the LAN/WAN may be 10 base T, 100Base Tx, Gigabyte Ethernet, 10G Ethernet, 40G Ethernet, ATM, Frame Relay, and the like. A user connected to a Local Area or Wide Area Network (LAN/WAN) 106 makes a request for content from the subscriber equipment 115 such as a computer terminal 116. The request for content (e.g., video content) is modulated by the modem 114 onto the LAN/WAN network to a data link converter 112. The data link converter 112 attaches IP packets to the user's request signal for upstream transport over the stream distribution network 104 to the head-end 101. The switch 142 receives and routs the user request to the infrastructure system manager 140 where the user request is checked by the system manager 140 for proper user identification, billing, availability and permissions for the requested content, and other administrative functions. Upon allowing the user request, a session is established, whereby the system manager 140 sends a signal to the stream caching server 102 to stream the selected video to the access network of the requester.

In particular, the stream caching server 102 streams retrieves the selected video, which is stored as IP packets in the storage medium 148, and routs the IP packets to the MPEG processor 144 via the switch 142. In an instance where the underlying payload content 350 that the user requested is already in a format required by the access network 111, then the IP packets 300 containing the underlying payload content 350 are routed to the data link converter 112 via the stream distribution network 104. However, if the RTP payload portion 350 of the IP packets 300 contain underlying content in a format that is not native to the access network 111 from where the request originated, then the underlying packets in the RTP payload 350 are transcoded by the MPEG processor 144 into a format native to the LAN/WAN network 106 as described above. The switch 142 then routs the transcoded IP packets 300 over the stream distribution network 104 to a data link converter 112.

The data link converter 112 receives the routed IP packets from the stream distribution network 104 and extracts the underlying content in the RTP payload 350 (whether transcoded or not) from the remaining portion of the IP packet 300. The data link converter 112 then modulates the extracted program content for transmission to the requester's subscriber equipment 115, such as a computer terminal 116. One example of a data link converter 112 is a DIVA Digital link (DDL 500) manufactured by DIVA Systems Inc. of Redwood City, Calif. The DLL 500 may comprise a compact PCI-based assembly containing a set of circuit cards that provide communications between the subsystems in the head-end 101 and the subscriber equipment 115 of the user (e.g., home, office, and the like). The data link converter comprises a controller card, one or more Fiber Input boards (FIB), multiplexer boards, and a plurality of QAM modulators. In general, the data link converter receives and sends data to and from the video switch. In-band content streams are transferred from the FIB, through the Multiplexer, and to the QAM modulators, which modulate the program content on individual QAM channel over the LAN/WAN 106 (e.g., Ethernet) network. A modem (e.g., modem 114), coupled to the subscriber equipment 115, then demodulates video content and transfers the demodulated packets for processing and viewing at the subscriber equipment 115 (e.g., computer terminal 116).

FIG. 1 also depicts the inventive system 100 for a subscriber for services (e.g., video-on-demand services), which is coupled to a digital subscriber line (DSL) access network $111_2$. The DSL access network $111_2$ comprises the data link converter 118, a local carrier (e.g., T1, T3, and the like) 108, a digital subscriber line access multiplexer (DSLAM) 119, a digital subscriber line modem 120 (x-DSL modem, where "x" represents a specific type of DSL modem) and the subscriber equipment 115 (e.g., computer terminal 122 or digital video recorder (DVR) 124).

A DSL subscriber also receives the requested program content in a similar manner as described with regard to the LAN/WAN access network 106. Specifically, the server 102 streams content via the stream distribution network 104 to a data link converter 118 that is designated for that particular subscriber. More specifically, the data link converter 118 receives the IP packets 300 from the distribution network 104 and then extracts the underlying content packets from the RTP payload 350. The underlying content packets may be in a format as originally stored on the storage medium 148 at the head-end 101 or transcoded to a format required by the DSL access network 108 in the same manner as previously discussed. The data link converter 118 then converts the extracted packets into a format pertaining to the carrier network 108 such as ATM, Ethernet, and the like. The newly converted packets containing the underlying content is then transferred by the data link converter 118 to the DSLAM 119 over the local carrier (e.g., T1 or T3 carrier lines) 108. The DSLAM 119 then multiplexes the requested content to the particular digital subscriber line modem 120 (x-DSL modem, where "x" represents a specific type of DSL modem) of the requester for services.

For real time information distribution, the xDSL modem 120 is a VDSL (Very high data rate Digital Subscriber Line). However, where the presentation of information does not have to be in real time, but may be a delayed presentation, then the xDSL modem 120 may be a ADSL (asynchronous DSL) modem, HDSL (high bit rate DSL) modem, or SDSL (synchronous DSL) modem, and the like. Such lower speed DSL modems are typically used during non-peak hours.

The x-DSL modem demodulates the content for processing and viewing at the subscriber equipment 115 (e.g., the computer terminal 122 or a display device (not shown) coupled to the DVR 124). Furthermore, a subscriber request for content or uploading content from the computer terminal 122 or set-top box (not shown) travels in the reverse path taken by the downstream content.

FIG. 1 also depicts a cable access network $111_3$. In particular, system 100 operates in a similar manner as described above with respect to the LAN/WAN or DSL access networks, except to format the content according to DOCSIS (data over cable service interface specifications) prior to transmission over the stream distribution network 104. Specifically, a DOCSIS media access control (MAC) layer 156 (drawn in phantom) is located at the head-end 101 before the stream distribution network 104. DOCSIS takes the IP packets and encapsulates them into the payload of a MAC packet. The packet processor 144 then encapsulates the MAC packet into the payload of an IP packet 300, such that an IP packet 300 carries a MAC packet, which carries an IP packet 300 having MPEG packets. As such the conversion into the MAC format occurs at the head-end 101, as opposed to downstream at the access network $111_3$. Furthermore, the switch 142 treats the MAC packets encapsulated in the IP packet as any other IP packet when distributing such IP packets over the distribution network 104. Moreover, the data link converter 118 simply extracts the MPEG transport packets from the MAC packets in a similar manner as discussed above.

The IP packets 300 carrying the requested content are distributed over the stream distribution network 104 and received by the data link converter 126, where illustratively, the MPEG packets 252 through 256 in the MAC packet payload are modulated over the cable network (e.g., hybrid fiber coax (HFC) 110 to the subscriber equipment 115. Specifically, the content is transmitted from the cable network 110 to a set top terminal 128 or a cable modem 130 that demodulates the program content for viewing on a computer terminal 132, display device coupled to the DVR 134 or the like. A request from a cable subscriber is processed via the cable network 110, the OOB (out of band) router 136, and the data link converter 126, which modulates the request back over the stream distribution network 104 to the head-end 101.

Although the system 100 is illustratively shown to stream program content to the LAN/WAN 106, the local carriers 108, and the cable network 110, the system 100 may also stream content to other types of access networks. Additionally, each system 100 actually streams content over many more access networks and subscriber terminals than illustratively depicted in FIG. 1.

Figure 2:
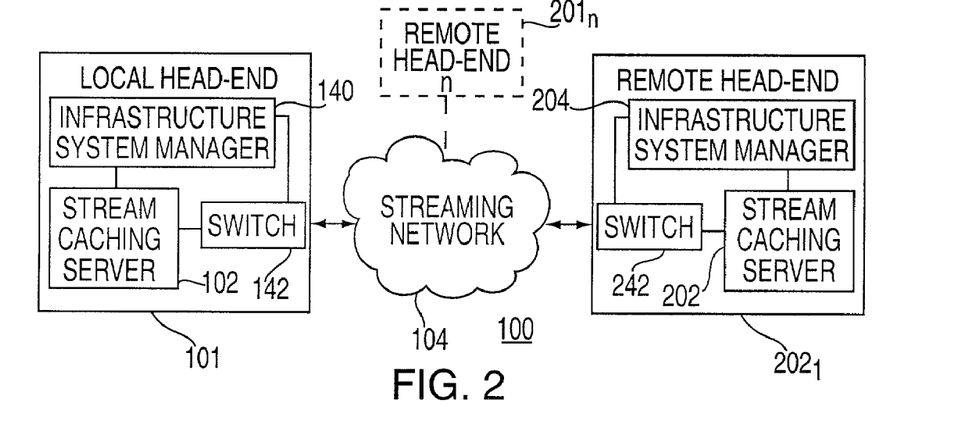
FIG. 2 depicts a high level block diagram of local and remote head-ends in the interactive information distribution system of FIG. 1.
Figure 4:
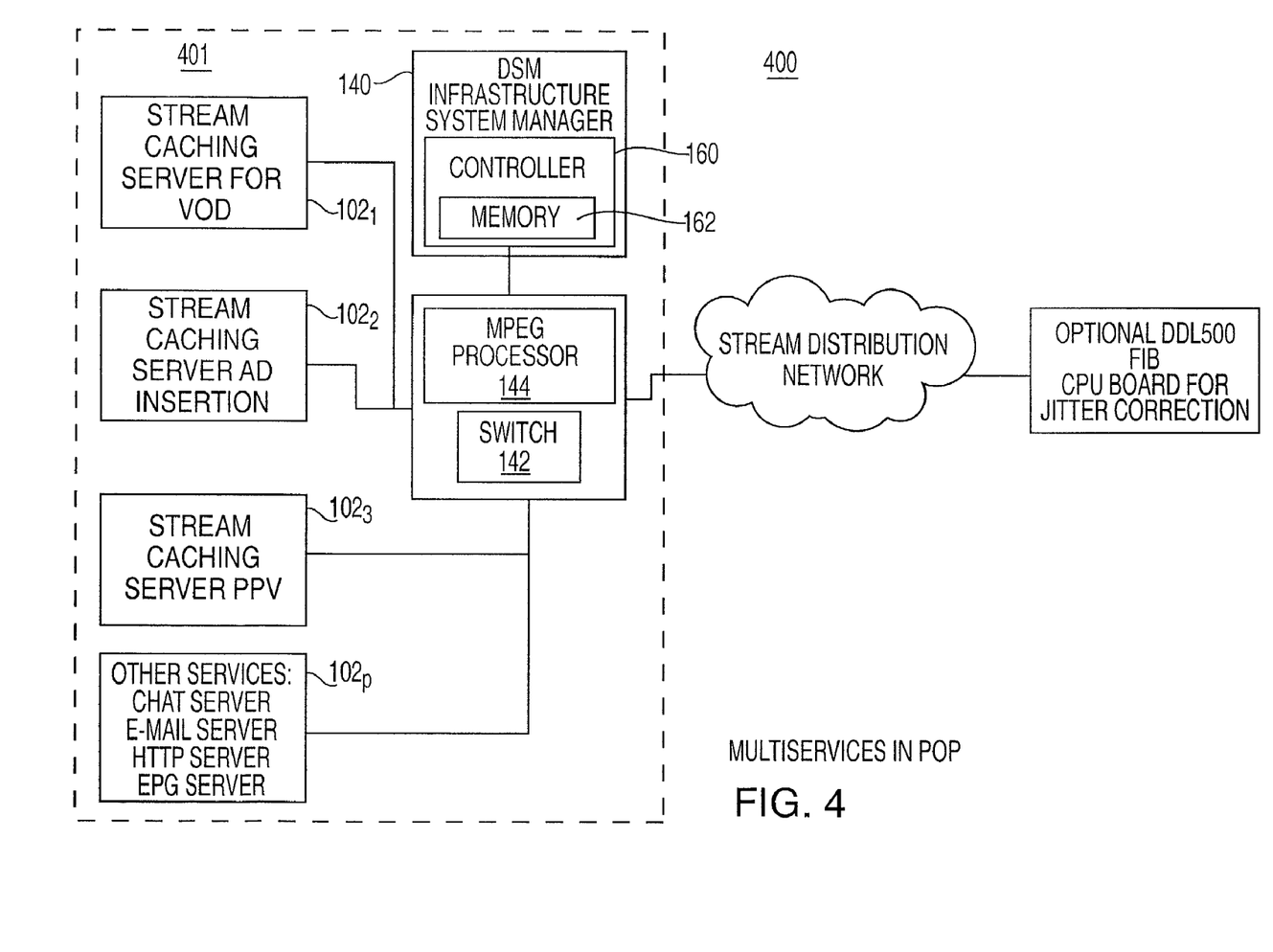
FIG. 4 depicts a block diagram of a plurality of points of presence for providing varying types of content.

FIG. 4 depicts a block diagram of a plurality of points of presence (POP) for varying types of content. In particular, the system 400 comprises local head-end 401 having a stream caching server for VOD $102_1$, a stream caching server for advertisement insertion $102_2$, a stream caching server for Pay-Per-View $102_3$, and other servers $102_p$ such as a chat server, e-mail server, http server, electronic program guide server, and the like, all coupled to the switch 142. The remaining portions of FIG. 2 are the same as in FIG. 1, except only the distribution network and one data link converter (e.g., 106) is shown for simplicity.

The requester may select content from any point of presence (i.e., server) containing information that is networked to the Internet backbone. That is, as long as the packet processor 144 can groom and transcode the underlying content packets in the IP packet 300 into a format native to the access network from which the request originates, then the inventive distribution system 200 may retrieve data from virtually any type of information (i.e., content) distributed by a server, whether the content is audio, video, data, voice, or otherwise.

Figure 5:
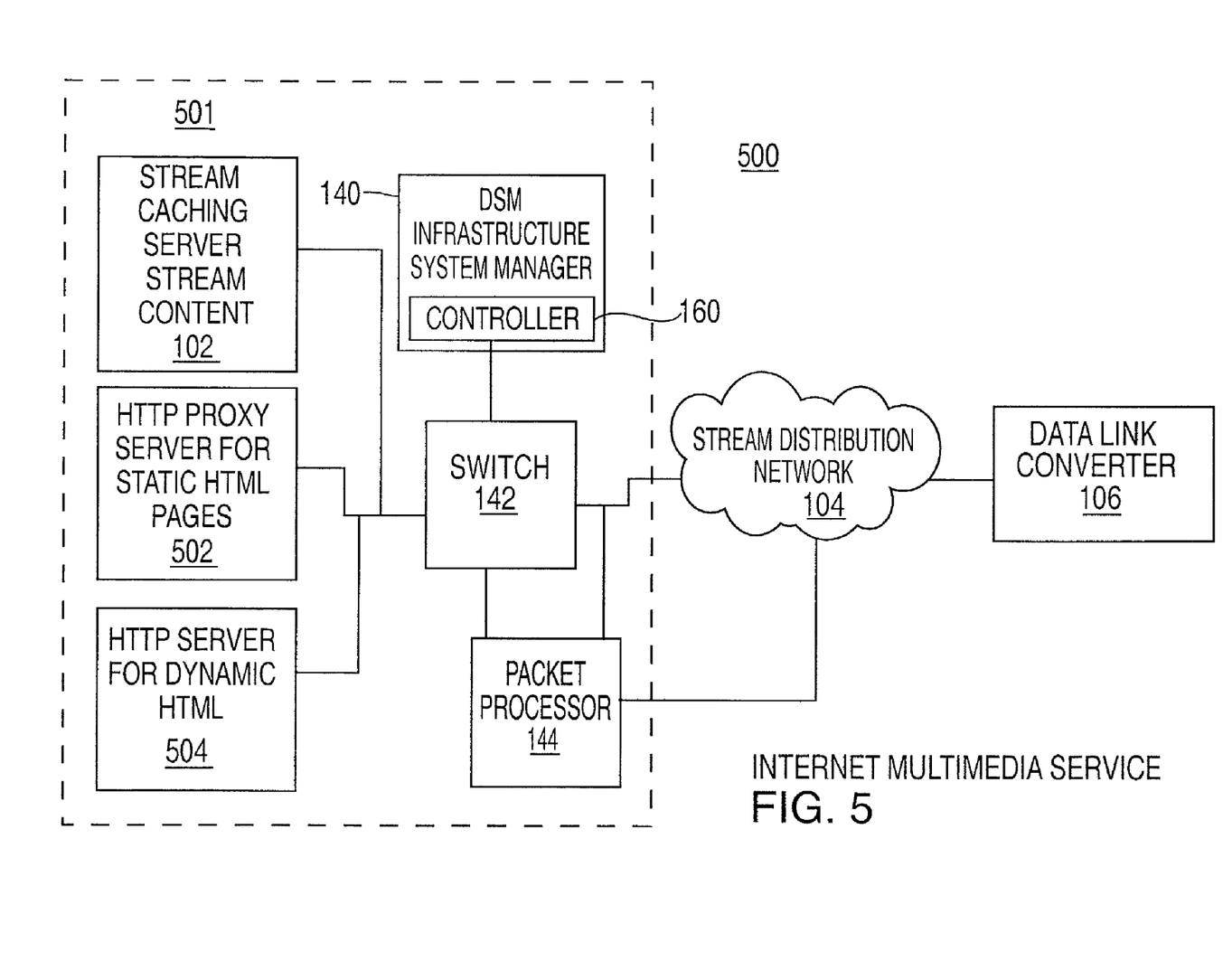
FIG. 5 depicts a block diagram of a third embodiment of the invention for an Internet multimedia service.

FIG. 5 depicts a block diagram of a third embodiment of the invention for an Internet multimedia service 500. A head-end 501 is coupled to the stream distribution network 104 as discussed in FIGS. 1 and 2, as well as the plurality of access networks 111 (only the data link converter of one access network 111 shown for simplicity). The head-end 501 comprises a the stream caching server 102, a hypertext transfer protocol (http) proxy server 502 for static hypertext markup language (HTML) pages, a http server 504 for dynamic HTML pages, the infrastructure system manager 140, and packet processor 144, which are all coupled to the switch 142.

In this embodiment, the stream caching server 102, the http proxy server for static HTML pages 502, and the http server for dynamic HTML pages 504 may be synchronized with the stream caching server 102 such that a presentation to a subscriber is a multimedia presentation where the viewer is illustratively streamed a movie or audio (via the stream caching server 102) along with a web page (via the static and/or dynamic http servers 502 and/or 504). Segmenting the network in this manner permits steaming of information over less than high quality service channels for information that does not require such high quality standards.

Since the stream server 101 is designed for streaming packets, while the http servers 502 and 504 are not, and the http servers 502 and 504 are designed for random access while the stream server 102 is not, then combining the two types of servers into a single server would result in thrashing when retrieving and streaming content and underutilization of the single server. As such, providing separate http servers 502 and 504 with the stream caching server 102 allows the network to designate bandwidth according to the type of information requested from the appropriate server, and then multiplex the streams of requested information in the form of IP packets over the distribution network 104 for subsequent distribution to the access network where the request originated. In this manner, a requester on any access network 111 is seamlessly provided with various types of content from dedicated sources simultaneously, without interruptions due to latencies between each type of source.

FIG. 2 depicts at least one remote head-end $201_1$ (where head-end $201_n$ is drawn in phantom) coupled to the interactive information distribution system 100 of FIG. 1. Each remote head-end 201 of the system 100 comprises a stream caching server 202, an infrastructure system manager 204, switch 242, and other hardware and software components as described above with regard to the local head 101. Each remote head-end 201 is coupled to the stream distribution network 104 via its respective switch 242.

When the local head-end 101 receives a user request for content, the local infrastructure system manager 140 determines whether the requested content selection is stored in the local storage medium 148. If the requested content is not in the local storage medium 148, the local infrastructure system manager 140 identifies a remote stream caching server 202 that stores the requested program content and then provides a server request to the remote system manager 204. In response to this server request, the remote stream caching server 202 streams the requested program content over the stream distribution network 104 to the local stream caching server 102.

For example, the system manager 140 at a local head end 101 located in a first city may receive a request for a particular content selection. If the content is not in the storage medium 148, the system manager 140 coordinates the retrieval of the requested content from another remotely located server 202, such as a remote server 202 located in a second city. The content is streamed from the remote server 202 to the local server 102 via the distribution network 103 and then streamed to the local access network of subscriber. If the manager 140 determines there are enough user requests above some predetermined threshold number, then the retrieved content is also stored locally in the storage medium 148.

The manager 140 provides session management for streaming content in accordance to the RTP Control Protocol (RTCP). Such management is particularly important in the case of content streamed to the local stream caching server 102 from the remote server 202. If any errors occurred during the streaming from the remote server 202, these errors are multiplied when the cached or stored content is subsequently streamed to the many subscribers. RTCP enables the detection and transmission of only the read blocks affected by the streaming errors. Additionally, the manager 140 may selectively stream content (e.g., a movie)

at off peak times, when the costs for bandwidth are lower than peak usage hours (e.g., after midnight). The content may be streamed as between two or more servers to facilitate local storage at various head-ends. Likewise, a requester may preorder content and have the content downloaded to a subscriber's digital video recorder (DVR) at such low traffic times of the day. In this manner, bandwidth allocation is controlled by the infrastructure system manager 140 to improve the quality of service over the distribution system 100 and guarantee fidelity for DVR applications.

Another inventive aspect of the system 100 involves streaming of content in real time. The server 102 continuously receives content from a remote server 202 and streams the received content in real time to a plurality of subscriber terminals. Additionally, the server 102 may store and stream content that is preprocessed in accordance to the IP format. Such preprocessing is described in co-filed patent application entitled "Method and Apparatus For Preprocessing and Post Processing content in an Interactive Information Distribution System", patent application Ser. No. 09/772,288, which is hereby incorporated herein by reference in its entirety.

Furthermore, an application program such as a video player (e.g., REALAUDIO™. REALVIDEO™, REALPLAYER™, and the like may be stored at the head-end 101 and streamed to a subscriber who is requesting content. Streaming such application program is much faster than having to download such application program by using an FTP file or the like. Therefore, quality of control and operation from the perspective of the subscriber is greatly improved. In addition, the subscriber equipment 115 (e.g., a set-top box) does not have to store such application program permanently, since the application program can be quickly downloaded from the stream server 102.

Figure 6:
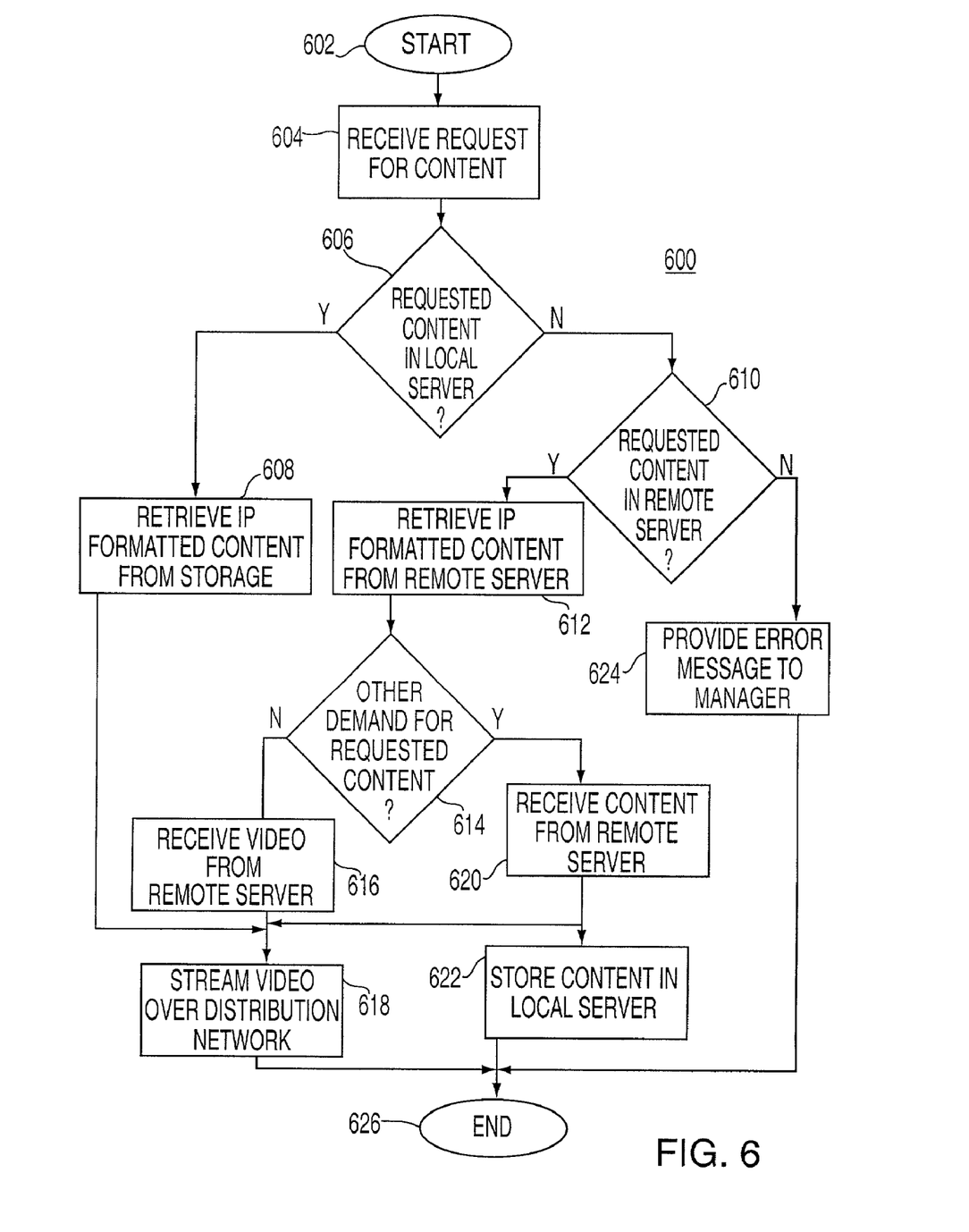
FIG. 6 depicts a flow diagram of a method for responding to a user request for particular content over the system of FIG. 2

FIG. 6 depicts a flow diagram of a method 600 to respond to a request for a particular program content selection. A local stream caching server 102 may implement the method 600 upon executing the software 152 by the CPU 146. Initially, the method 600 starts at step 602 and proceeds to step 604, where a request for a program content is received from subscriber equipment 115 such as a subscriber terminal. At step 606, a query determines whether the requested program content is available from the stream caching server 102, Namely, step 606 determines whether the requested program content is stored in the storage medium 148.

If the requested program content is available from the stream caching server 102, the method 600 proceeds to step 608 where the IP formatted program content is retrieved from the storage medium 148. The retrieved content is streamed over the distribution network 104 at step 618. After this streaming, the method 600 ends at step 626.

If the requested program content is not in the stream caching server 102, the method 600 proceeds to step 610 where a query determines whether the requested program content is in a remote streaming caching server 202. If the requested program content is not in any remote streaming caching server 202 within the system 100, the method 600 proceeds to step 624 to provide an error signal to the system manager 140, and the method 600 ends at step 626. If the requested program content is present in a remote streaming caching stream server 202, then in step 612,the method 600 retrieves the IP formatted program content from the remote stream server 202.

The method 600 proceeds to step 614, where a query determines whether there is other demand for the requested program content retrieved from the remote stream server 202. Namely, in step 614, a the system manager 140 determines whether there is enough interest in that program content, i.e., whether a threshold number of subscribers ordered or requested that program content. If there is no real demand, i.e., demand is below a threshold level, then the method 600 proceeds to step 616 where the program content is simply received from the remote stream server 202. The method 600 proceeds to stream video over the distribution network at 618 and ends at step 626.

If there is other demand for the requested program content, i.e., demand is above the threshold level, then the method 600 proceeds to stream the program content over the distribution network 104 at step 620 and store the program content in the storage medium 148 at step 622. The Thereafter, in step 618, the program content is streamed over the distribution network 104 to the subscriber, and the method 600 ends in step 626.

Figure 7:
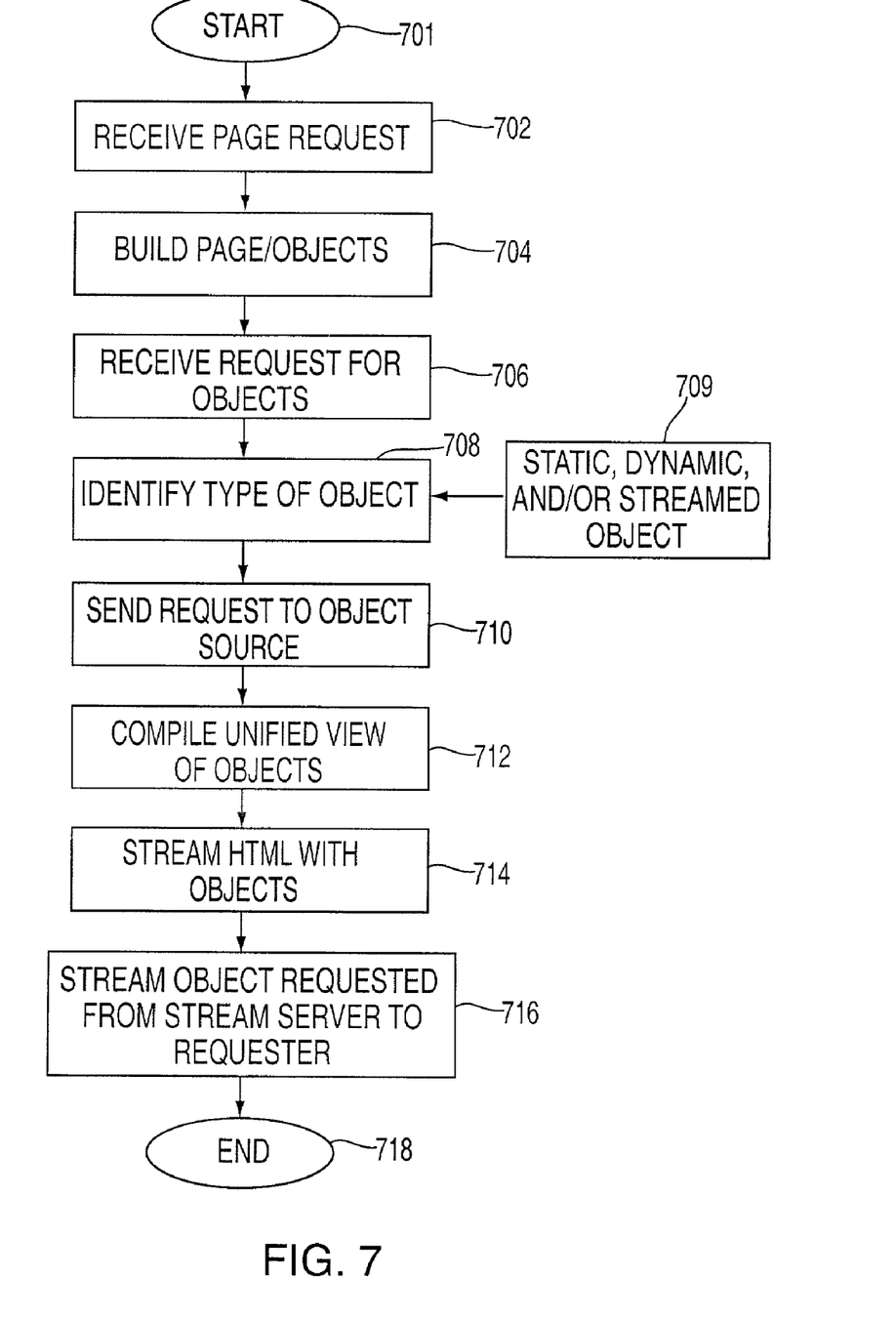
FIG. 7 depicts a flow diagram of a method of transferring the types of content from the plurality of points of presence of FIG. 4.

FIG. 7 depicts a flow diagram of a method of for adapting content delivery. Specifically, FIG. 7 depicts a flow diagram of a method 700 suitable for use in the system 500 of FIG. 5 for delivering content to a client. The method 700 of FIG. 7 is entered at step 702 when an HTML page request is received from a subscriber.

At step 704, the requested page is created using either static and/or dynamic HTML pages and/or objects. At step 706, a request for an object is received from the client. At step 708, the type of object requested is identified. As shown in FIGS. 4 and 5, the requested object may comprise one of a static object, a dynamic object, a streaming object, and the like.

At step 710, the resource associated with the requested object is requested to be provided based on, for example, the Uniform Resource Locator (URL) associated with the requested object. In the case of a static HTML resource, a request is forwarded to the static HTML page proxy server 502 of FIG. 5. In the case of a request associated with a dynamic HTML page, a request is forwarded to the dynamic HTML page server 504. In the case of a request for streaming content, a request is forwarded to the stream caching server 102.

At step 712, the static and/or dynamic HTML information (including related objects) is compiled. At step 714, static and/or dynamic HTML information (including related objects) is transmitted to the requesting client. The transmitted information is adapted to be processed by the client to produce an image on, for example, a browser display screen. It is noted that the displayed image may be divided into a plurality of regions or frames, a plurality of objects, and the like.

At step 716, a streaming object requested at step 706 by the client, and requested from the stream caching server 103 by controller 160 at the system manager 140, is streamed through the distribution network 104 to the client, such that the client display image will show the streamed information in an appropriate object or frame. Thus, in the case of a client selecting an object associated with video imagery and/or audio information, a client-side display object, such as a frame or other image region will be used to delineate an image area associated with the streamed content. In this manner, the stream caching server 102, http proxy server 502 and 504, as well as any other servers providing various types of content (e.g., mail server, chat server, and the like) are coordinated to provide to a client requested content in efficient and seamless manner, and in step 718, the method 700 ends.

Although various embodiments that incorporate the teachings of the present invention have been shown and described in detail herein, those skilled in the art can readily devise many other varied embodiments that still incorporate these teachings.

What is claimed is:

1. A method of streaming content via a distribution network to any of a plurality of heterogeneous access networks, comprising:
encapsulating content according to the steps of:
preprocessing said content into at least one packet having a format and size optimized for storage and retrieval at a local streaming server, wherein said preprocessing step further comprises transcoding said content into at least one packet format, wherein said transcoding occurs prior to storage on said local streaming server:
encapsulating said at least one packet of content in a payload portion of a real time transport protocol (RTP) packet: and
encapsulating said RTP packet in a payload portion of an Internet Protocol (IP) packet structure:
retrieving from said local streaming server, said content encapsulated according to said IP packet structure;
processing, at said local streaming server, said retrieved content into a format native to an access network from which a user request originated;
streaming processed content to said access network via said distribution network, said distribution network format being different than said access network formats; and
extracting said content from said IP packet downstream of said distribution network.

2. The method of claim 1 further comprising formatting said content to support playback at a quality of service (QoS) corresponding to said at least one access network.

3. The method of claim 1 further comprising the step of storing said encapsulated content in said IP packet structure on a storage medium coupled to said local streaming server.

4. The method of claim 3 further comprising the step of retrieving said content from said local streaming server in response to a user request from said at least one access network.

5. The method of claim 4 further comprising the step of retrieving said content from a remote stream server that is remotely located from said local stream server in an instance where said content is unavailable from said local stream server.

6. The method of claim 5 further comprising the step of storing said retrieved content from said remote stream server on said storage medium coupled to said local stream server in an instance where a predefined user request threshold has been exceeded.

7. The method of claim 1 wherein said streaming step comprises streaming said content in real time.

8. The method of claim 1 wherein said preprocessing step further comprises transcoding said content into at least one packet format selected from the group of packet formats comprising MPEG-1, MPEG-2, MPEG-4, AVI, MJPEG, QUICKTIME ™, MP3, REAL NETWORKS™, REAL VIDEO™, REAL AUDIO™, and MICROSOFT ™ media player.

9. The method of claim 8 wherein said preprocessing step further comprises storing said content in said at least one of said packet formats from said group at said local stream server.

10. The method of claim 1 wherein said processing step further comprises:
transcoding said content into at least one packet format selected from the group of packet formats comprising MPEG-1, MPEG-2, MPEG-4, AVI, MJPEG, QUICKTIME™, MP3, REAL NETWORKS™, REAL VIDEO™, REAL AUDIO™, and MICROSOFT™ media player, wherein said transcoding occurs after storage.

11. The method of claim 10 wherein said transcoding step comprises:
separating said IP packet into a header portion and a payload portion encapsulating said at least one packet of content;
converting said at least one packet of content into a format supported by said access network; and
packetizing said header portion and said converted at least one packet of content into said IP packet.

12. The method of claim 1 wherein said at least one access network is selected from the group comprising a wide area network, a local area network, a cable network, a carrier network, a satellite network, a terrestrial network, wireless network, and an internet network.

13. The method of claim 1 further comprising transmitting said content from said at least one access network to subscriber equipment of a requester for said content.

14. The method of claim 1 wherein said at least one access network comprises a plurality of non-homogeneous access networks.

15. The method of claim 1, wherein:
said distribution network comprises one or more of a synchronous optical network (SONET) and an asynchronous transfer mode (ATM) network.

16. The method of claim 15, wherein:
said plurality of access networks comprise two or more of a local area network (LAN), a wide area network (WAN), a digital subscriber line (DSL) network and a cable television distribution network.

17. An apparatus providing scalable streaming of content to at least one access network of a plurality of heterogeneous access networks associated with an interactive information distribution system, said apparatus comprising:
at least one stream caching server for streaming said content as an Internet Protocol (IP) packet to said at least one access network via a stream distribution network in response to a request for content, said content being encapsulated within said IP packet, wherein each said IP packet further comprises said content encapsulated in a payload portion of a Realtime Transport Protocol (RTP) packet; and
a packet processor coupled to said at least one stream caching server for processing said encapsulated content within said IP packets into at least one packet in a format native to said at least one access network of said plurality of heterogeneous access networks prior to streaming said IP packet to said at least one access network via said stream-distribution network, wherein the format of said distribution system is different than the formats of said access networks and a number of content packets in each RTP payload is configured as a read block for transcoding of said content packets into a format supported by said access networks,
wherein said content is stored as said IP packets on at least one storage medium respectively coupled to said at least one stream caching server.

18. The apparatus of claim 17 wherein said at least one access network comprises a plurality of non-homogeneous access networks.

19. The apparatus of claim 17 wherein each said IP packet further comprises said RTP packet encapsulated in a payload portion of said IP packet.

20. The apparatus of claim 17 wherein said at least one stream caching server comprises a local stream caching server coupled to at least one remote stream caching server via said stream distribution network.

21. The apparatus of claim 20 wherein said at least one remote stream caching server streams said content to an access network in response to said request for content in an instance said requested content is unavailable from said local caching server.

22. The apparatus of claim 17 wherein said content is formatted to support playback at a quality of service (QoS) corresponding to said at least one access network.

23. The apparatus of claim 17 wherein said packet processor transcodes said content into at least one packet selected from the group of packet formats comprising MPEG-1, MPEG-2, MPEG-4, AVI, MJPEG, QUICK-TIME™, MP3, REAL NETWORKS™, REAL VIDEO™, REAL AUDIO™, and MICROSOFT™ media player.

24. The apparatus of claim 23 wherein said transcoded content is stored as said at least one of said packet formats from said group prior to storing said IP packets.

25. The apparatus of claim 23 wherein said content is transcoded as said at least one of said packet formats from said group prior to streaming said IP packets.

26. The apparatus of claim 17 wherein said at least one access network further comprises a data link converter for transferring said content to subscriber equipment of a requester for said content.

27. The apparatus of claim 26 wherein said data link converter extracts said content native to said at least one access network from said IP packet.

28. The apparatus of claim 18 wherein said at least one access network is a network selected from the group comprising a local area network, wide area network, cable network, satellite network, digital subscriber line, wireless network, and a terrestrial network.

29. The apparatus of claim 17 wherein said interactive information distribution system further comprises at least one random access data server coupled to said at least one stream server via said distribution network.

30. The apparatus of claim 29 wherein said at least one random access data server is a server selected from the group comprising an HTTP proxy server for static web pages, an HTTP proxy server for dynamic web pages, a chat server, and an electronic program guide server, an e-mail server.

31. The apparatus of claim 17 wherein said at least stream caching server is a server selected from the group comprising a video-on-demand server, a pay-per-view server, and a digital broadcast server.

* * * * *

UNITED STATES PATENT AND TRADEMARK OFFICE
CERTIFICATE OF CORRECTION

PATENT NO. : 7,159,235 B2 Page 1 of 1
APPLICATION NO. : 09/772287
DATED : January 2, 2007
INVENTOR(S) : Yong Ho Son et al.

It is certified that error appears in the above-identified patent and that said Letters Patent is hereby corrected as shown below:

Column 4, line 61, delete "3D" and insert instead --3B--; line 67, delete "(e.g." and insert instead --(e.g.,--.
Column 5, line 23, delete "In" and insert instead --in--.
Column 11, line 4, delete "requester" and insert instead --requestor--; line 44, delete "102," and insert instead --102.--.
Column 13, line 15, in claim 1, delete "server" and insert instead --server;--; line 18, in claim 1, delete "packet:" and insert instead --packet;--; line 20, in claim 1, delete "structure:" and insert instead --structure;--; line 59, in claim 8, delete "QUICKTIME ™" and insert instead --QUICKTIME™--; line 60, delete "MICROSOFT ™" and insert instead --MICROSOFT™--.

Signed and Sealed this

Twenty-eighth Day of August, 2007

JON W. DUDAS
*Director of the United States Patent and Trademark Office*